US011853684B2

(12) United States Patent
Lee et al.

(10) Patent No.: US 11,853,684 B2
(45) Date of Patent: *Dec. 26, 2023

(54) SYNCHRONIZATION AND TAGGING OF IMAGE AND TEXT DATA

(71) Applicant: Palantir Technologies Inc., Denver, CO (US)

(72) Inventors: Suchan Lee, Sunnyvale, CA (US); Jon Paek, Sunnyvale, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,955

(22) Filed: Dec. 20, 2022

(65) Prior Publication Data

US 2023/0122716 A1 Apr. 20, 2023

Related U.S. Application Data

(63) Continuation of application No. 17/377,758, filed on Jul. 16, 2021, now Pat. No. 11,562,120, which is a (Continued)

(51) Int. Cl.
| | |
|---|---|
| *G06F 3/0482* | (2013.01) |
| *G06F 40/117* | (2020.01) |
| *G06F 9/451* | (2018.01) |
| *G06F 16/51* | (2019.01) |
| *G06F 16/583* | (2019.01) |
| *G06F 16/93* | (2019.01) |
| *G06F 40/109* | (2020.01) |

(Continued)

(52) U.S. Cl.
CPC ........... *G06F 40/117* (2020.01); *G06F 9/451* (2018.02); *G06F 16/51* (2019.01); *G06F 16/5846* (2019.01); *G06F 16/93* (2019.01); *G06F 40/109* (2020.01); *G06F 40/134* (2020.01); *G06V 10/40* (2022.01); *G06V 30/10* (2022.01)

(58) Field of Classification Search
CPC ........ G06F 40/117; G06F 9/451; G06F 16/51; G06F 16/5846; G06F 16/93; G06F 40/109; G06F 40/134; G06V 10/40; G06V 30/10
See application file for complete search history.

(56) References Cited

U.S. PATENT DOCUMENTS

| | | | | | |
|---|---|---|---|---|---|
| 5,878,421 | A | * | 3/1999 | Ferrel | ................ G06F 40/106 |
| 5,883,986 | A | * | 3/1999 | Kopec | ................ G06V 30/262 |
| | | | | | 382/230 |

(Continued)

*Primary Examiner* — Hassan Mrabi
(74) *Attorney, Agent, or Firm* — Knobbe, Martens, Olson & Bear, LLP

(57) ABSTRACT

A computing system accesses an image-based document and a text document having text extracted from the image-based document and provides a user interface displaying at least a portion of the image-based document. In response to selection of a text portion of the image-based document, the system determines an occurrence of the text portion within at least a portion of the image-based document and then applies a search model on the text document to identify the same occurrence of the text portion. Once matched, alignment data indicating a relationship between a selected tag and both the text portion of the image-based document and the text portion of the text document is stored.

20 Claims, 11 Drawing Sheets

Related U.S. Application Data continuation of application No. 16/540,951, filed on Aug. 14, 2019, now Pat. No. 11,093,690.

(60) Provisional application No. 62/876,911, filed on Jul. 22, 2019.

(51) Int. Cl.
*G06F 40/134* (2020.01)
*G06V 10/40* (2022.01)
*G06V 30/10* (2022.01)

(56) References Cited

U.S. PATENT DOCUMENTS

| | | | | |
|---|---|---|---|---|
| 6,230,173 B1* | 5/2001 | Ferrel | | G06F 40/117 |
| | | | | 715/205 |
| 6,687,404 B1* | 2/2004 | Hull | | G06V 30/40 |
| | | | | 382/226 |
| 8,132,151 B2* | 3/2012 | Ahern | | G06F 9/45512 |
| | | | | 715/764 |
| 9,268,748 B2* | 2/2016 | Davis | | G06F 3/04842 |
| 10,423,709 B1* | 9/2019 | Bradley | | G06F 16/9577 |
| 10,614,345 B1* | 4/2020 | Tecuci | | G06N 3/08 |
| 10,762,280 B2* | 9/2020 | Bradley | | G06F 40/279 |
| 10,809,888 B2* | 10/2020 | Sun | | G06F 16/907 |
| 11,093,690 B1 | 8/2021 | Lee et al. | | |
| 11,562,120 B2 | 1/2023 | Lee et al. | | |
| 2002/0188636 A1* | 12/2002 | Peck | | G06F 40/166 |
| | | | | 715/275 |
| 2004/0093331 A1* | 5/2004 | Garner | | A61P 21/02 |
| 2007/0226510 A1* | 9/2007 | Iglesia | | H04L 63/123 |
| | | | | 713/177 |
| 2009/0249178 A1* | 10/2009 | Ambrosino | | G06F 40/131 |
| | | | | 715/205 |
| 2010/0011410 A1* | 1/2010 | Liu | | H04L 63/20 |
| | | | | 726/1 |
| 2011/0093489 A1* | 4/2011 | Gawor | | G06F 16/353 |
| | | | | 707/769 |
| 2012/0158739 A1* | 6/2012 | Ah-Pine | | G06F 16/43 |
| | | | | 707/E17.084 |
| 2012/0159304 A1* | 6/2012 | Listou | | G06F 16/2423 |
| | | | | 715/227 |
| 2012/0203750 A1* | 8/2012 | Vaananen | | G06F 16/24578 |
| | | | | 707/706 |
| 2013/0095864 A1* | 4/2013 | Marovets | | G06Q 30/0239 |
| | | | | 455/466 |
| 2013/0166550 A1* | 6/2013 | Buchmann | | G06F 16/907 |
| | | | | 707/E17.058 |
| 2014/0281877 A1* | 9/2014 | Burge | | G06F 40/169 |
| | | | | 715/230 |
| 2014/0282120 A1* | 9/2014 | Sun | | G06F 16/907 |
| | | | | 715/760 |
| 2014/0282121 A1* | 9/2014 | Sun | | G06F 16/907 |
| | | | | 715/760 |
| 2015/0055867 A1* | 2/2015 | Wade | | G06Q 50/184 |
| | | | | 707/743 |
| 2015/0135056 A1* | 5/2015 | Sekharan | | G06F 16/972 |
| | | | | 715/234 |
| 2015/0149892 A1* | 5/2015 | Roy | | G06F 16/907 |
| | | | | 715/239 |
| 2016/0034514 A1* | 2/2016 | Singhal | | G06F 16/9535 |
| | | | | 707/706 |
| 2016/0147891 A1* | 5/2016 | Chhichhia | | G06F 16/986 |
| | | | | 707/734 |
| 2016/0253597 A1* | 9/2016 | Bhatt | | G06N 20/00 |
| | | | | 706/12 |
| 2016/0335731 A1* | 11/2016 | Hall | | G06Q 10/067 |
| 2017/0315967 A1* | 11/2017 | Boucher | | G06F 40/177 |
| 2019/0122043 A1* | 4/2019 | Bala | | G06V 30/416 |
| 2019/0156426 A1* | 5/2019 | Drucker | | G06Q 40/08 |
| 2020/0073921 A1* | 3/2020 | Bradley | | G06F 40/174 |
| 2020/0184278 A1* | 6/2020 | Zadeh | | G06N 3/044 |

* cited by examiner

SYNCHRONIZATION AND TAGGING OF IMAGE AND TEXT DATA

TECHNICAL FIELD

The present disclosure relates to identification of matching portions of files and creation of linking data indicating the matching portions.

BACKGROUND

A data system may include multiple types of data, spread across numerous data stores and/or databases, each of which may comprise data in different formats. A data ingestion system, which may be at least partially automated, may attempt to identify characteristics of data items (e.g., files of various types) that are stored in a data management system. Data items may then be viewed by a user, such as to allow the user to make assertions regarding the data and/or to identify portions of the data for further review, either by the user and/or other users. Thus, providing the data items in a way that maximizes the user's ability to identify relevant portions of data items, regardless of the format of the data items that are originally processed by the data ingestion system, can increase efficiency of such a data management system.

SUMMARY

Image-based documents (such as PDF documents) may include text in a particular layout, format, spacing, etc. that is preserved for viewing of the documents across viewing software, operating systems, and devices. Image-based documents may also include various graphic elements, such as photographs, charts, tables, logos, drawing elements, handwriting, hyperlinks, fields, etc. A document ingestion workflow may include a tagging process that identifies items of interest in documents manually and/or automatically. For example, a manual tagging process might involve a user (e.g., an ingestion specialist) reading through an image-based document to mark text as an object, a link between objects, or a property of an existing object, for example, in a data management system. To enable the user to select and tag content of image-based documents, ingestion systems may extract text data from those documents, such as via an optical character recognition (OCR) process. However, because of the great variety of graphical and text data that may be included in image-based documents, as well as graphic quality of image-based documents, extracted text data may include some recognition errors. Additionally, layout, formatting, font characteristics, and other characteristics of image-based documents often create artifacts in extracted text and/or cause text to be lost in the extraction process, making review of text extracts more challenging.

A user may want to work with both an image-based and text versions of a document, such as to tag portions of the more easily readable image-based document when reading through the document, while also tagging portion of the text version responsive to keyword searches of the text document. However, tags in one document do not appear in the other document, largely because of the difficulty in determining which portions of the differently formatted documents align with the same tagged content. Additionally, because text versions do not include graphics, there is not an option of tagging graphics in the text version and there is not currently a mechanism for tagging a graphical portion of an image-based document.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) *User Interface Design*. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In one embodiment, a computerized method, performed by a computing system having one or more hardware computer processors and one or more non-transitory computer readable storage device storing software instructions executable by the computing system, includes accessing an image-based document and a text document having text extracted from the image-based document; providing a user interface displaying at least a portion of the image-based document; receiving selection from a user of a text portion of the image-based document; receiving selection of a tag to be associated with the text portion of the image-based document; determining an occurrence of the text portion within at least a portion of the image-based document; searching at least a portion of the text document to identify the same occurrence of the text portion in the text document; and storing alignment data indicating a relationship between the selected tag and both the text portion of the image-based document and the text portion of the text document.

In some embodiments, the tag indicates that the text portion is one of an object, a link to one or more existing objects, or a property of one or more existing objects. In some embodiments, the at least a portion of the image-based document is the entire image-based document, a certain page of the image-based document, or a character range surrounding the text portion of the image-based document. In some embodiments, the image-based document is a portable document format (PDF) document. In some embodiments, the image-based document includes one or more graphical images. In some embodiments, the method further includes receiving selection of a graphical area of the image-based document; receiving selection of a second tag to be associated with the graphical area; and storing alignment data indicating a relationship between the second tag and the graphical area. In some embodiments, the method further includes determining a portion of the text document corresponding to a location of the graphical area of the image-based document, wherein the alignment data indicates the determined portion of the text document. In some embodiments, the method further includes extracting the graphical area; formatting the graphical area as an image file; and storing the image file.

In some embodiments, the method further includes normalizing the text portion of the image-based document by performing one or more of: removing extra punctuation; removing extra spaces; removing formatting; and removing prefixes and/or suffixes of words. In some embodiments, the method further includes transmitting one or more properties of the tag to one or more third party databases with a request for further information. In some embodiments, the tag includes one or more properties indicating the text portion or a title associated with the tag. In some embodiments, the method further includes determining a custom model to be used in searching the text document, wherein said searching the text document is performed based on the custom model. In some embodiments, the custom model is selected based on a file type of the image-based document or content of the image-based document. In some embodiments, the custom model indicates keys, tags, headers, or other indicator of content in the image-based document to be used in said searching the text document. In some embodiments, the method further includes exporting to an external computing system one or more of the tag, data related to the tag received from one or more third-party databases; or image files extracted from the image-based document. In some embodiments, a PDF file is generated to contain the exported information.

In one embodiment, a computing system comprises a hardware computer processor and a non-transitory computer readable medium having software instructions stored thereon, the software instructions executable by the hardware computer processor to cause the computing system to perform operations comprising accessing an image-based document and a text document having text extracted from the image-based document; providing a user interface displaying at least a portion of the image-based document; receiving selection from a user of a text portion of the image-based document; receiving selection of a tag to be associated with the text portion of the image-based document; determining an occurrence of the text portion within at least a portion of the image-based document; searching at least a portion of the text document to identify the same occurrence of the text portion in the text document; and storing alignment data indicating a relationship between the selected tag and both the text portion of the image-based document and the text portion of the text document. In some embodiments, the tag indicates that the text portion is one of an object, a link to one or more existing objects, or a property of one or more existing objects. In some embodiments, the at least a portion of the image-based document is the entire image-based document, a certain page of the image-based document, or a character range surrounding the text portion of the image-based document. In some embodiments, the image-based document is a portable document format (PDF) document.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 3 is an example user interface illustrating one embodiment of a tagging viewer that is usable to view image-based and text documents.

FIG. 4 is an example of the tagging viewer with text of the image-based document selected for tagging.

FIG. 8 is an example of a tagging viewer that is configured in a side-by-side viewing mode, showing a portion of both an image-based document and the corresponding portion of the text document.

DETAILED DESCRIPTION

Terms

Figure 1:
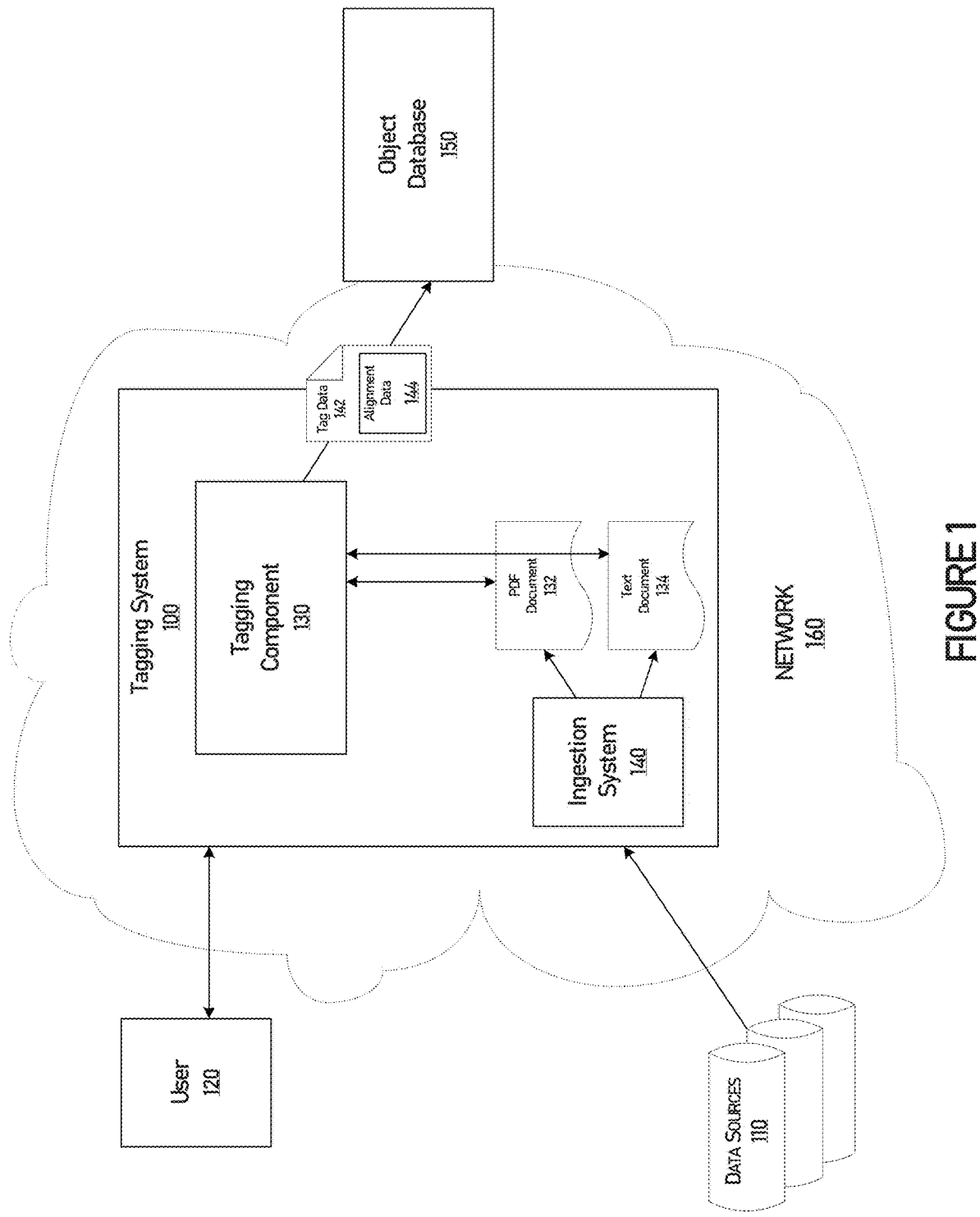
FIG. 1 is a block diagram illustrating one embodiment of a tagging system in communication with various other systems and components.

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Data Object or Object: A data container for information representing specific things in the world that have a number of definable properties. For example, a data object can represent an asset, a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., asset, person, event, or document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Application Programming Interfaces (APIs): an API is generally a defined communication channel, protocol, settings, etc. that allows two devices to exchange information between one another in a more direct manner than might otherwise be possible. In some embodiments, an API registration module may be configured to register individual devices (e.g. computing devices, Internet of things devices, sensors, etc.) for communication with a particular computing device (e.g., a central server that receives, processes, stores, provides, information to the individual devices) by issuing a token to the individual devices that authorizes such direct communications. Thus, a computing system may establish secure and direct communication channels with multiple devices via APIs.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

FIG. 1 is a block diagram illustrating one embodiment of a tagging system 100 in communication with various other systems and components. In this example, the tagging system 100 is configured to access data of various formats, such as image-based and text documents, and to coordinate tagging of portions of the data. In the example of FIG. 1, tagging system 100 includes an ingestion engine 140 configured to access, process, parse, analyze, etc. various forms of data that are of interest. For example, the ingestion engine may identify properties of documents, such as document name, type, keywords, related documents, etc. that are then stored in object database 150, such as in a hierarchical relationship according to a defined ontology (see discussion of FIG. 2 below, for example).

In the example of FIG. 1, a user 120 (e.g., an individual operating a computing device and/or the user computing device) interfaces with the tagging system 100, such as to view various documents that are received by the ingestion system 140. For example, the user 120 may view a PDF document 132 and/or a text document 134. In some instances, the PDF document 132 and text document 134 includes the same content, but in different file formats. For example, the PDF document 132 is an image-based document format that may include images, graphics, columns, headers, footers, indentations, headings, etc. that are not included in the corresponding text document 134.

In some circumstances, the user 120 may wish to view and tag content of a text document rather than a corresponding image-based document, while in other circumstances the user 120 may wish to view and tag the image-based document rather than the corresponding text document. The tagging component 130 is configured to allow the user to interface with either (or both) format of documents and to automatically create and synchronize tags between the different document versions. In the example of FIG. 1, the tagging component 130 provides tag data 142, such as information regarding content of each of the PDF document 132 and corresponding text document 134 associated with the tag, as well as alignment data 144 indicating a relationship between the tagged portions of each of the PDF document 132 and text document 134. The tag data 142 may be stored in object database 150, which may be organized according to an ontology such as to include objects that are associated with one another via links.

Figure 2:
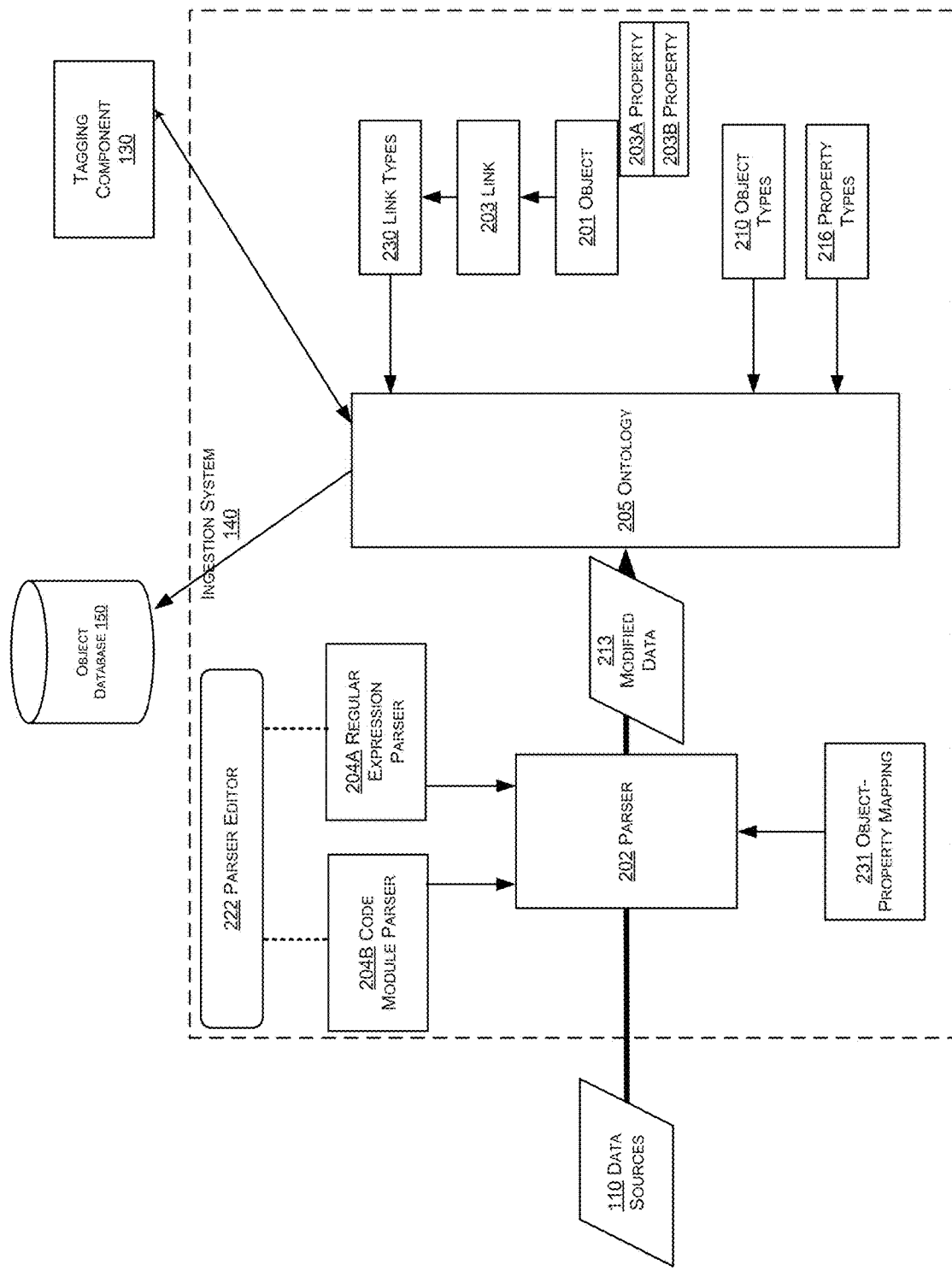
FIG. 2 is a block diagram illustrating exemplary components and data that may be used in identifying and storing data according to an ontology.

FIG. 2 is a block diagram illustrating exemplary components and data that may be used in identifying and storing data according to an ontology. For example, the ingestion system 140 may include many of the components illustrated in FIG. 2, which receives data from the data sources 110 and interfaces with users via the tagging component 130. In this example, the ontology 205 may be configured, and data in the data model populated, by a system of parsers and ontology configuration tools. In the embodiment of FIG. 2, the data sources 100 provide data (e.g., documents and files of various types and formats) to parser 202. For example, an institution may have one or more databases with information on credit card transactions, rental cars, and people. The data sources 110 may contain a variety of related information and attributes about each type of data, such as a "date" for a credit card transaction, an address for a person, and a date for when a rental car is rented. The parser 202 is able to read a variety of source input data types and determine which type of data it is reading.

In accordance with the discussion above, the example ontology 205 comprises stored information providing the data model of data stored in object database 150, and the ontology is defined by one or more object types 210, one or more property types 216, and one or more link types 230. Based on information determined by the parser 202 or other mapping of source input information to object type, one or more data objects 201 may be instantiated in the object database 150 based on respective determined object types 210, and each of the objects 201 has one or more properties 203 that are instantiated based on property types 216. Two data objects 201 may be connected by one or more links 203 that may be instantiated based on link types 230.

In an embodiment, a user of the system may use an editor to create and/or modify the object types 210 and define attributes, to create and/or modify the property types 216 and define attributes of the property types, and/or to create the link types 230. Alternatively, other programs, processes, or programmatic controls may be used to create link types and property types and define attributes, and using editors is not required.

In an embodiment, creating a property type 216 involves defining at least one parser definition using a parser editor 222. A parser definition comprises metadata that informs parser 202 how to parse data from data sources 100 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data.

Using the data types defined in the ontology, input data may be parsed by the parser 202 to determine which object type 210 should receive data from a record created from the input data, and which property types 216 should be assigned to data from individual field values in the input data. Based on the object-property mapping 231, the parser 202 selects one of the parser definitions that is associated with a property type in the input data. The parser parses an input data field using the selected parser definition, resulting in creating new or modified data 213. The new or modified data 213 is added to the object database 150 according to ontology 205 by storing values of the new or modified data in a property of the specified property type.

In one embodiment, parser editor 222 is configured to identify documents from the data sources 110 that are in image-based formats, such as PDFs, and to automatically generate corresponding text-based documents, such as by extracting text data from the image-based document and/or performing an optical character recognition process on the image-based document to obtain text. The image-based and text-based documents may then be viewable by a user, alternatively or side-by-side, and correlations between the documents stored in the object database 150.

Example Features of Tagging System

As will be discussed in further detail with reference to figures, certain embodiments of a tagging system may include some or all of the features noted below.

Tagging of text within an image-based document. In some embodiments, the tagging system 100 allows the user 120 to select text within an image-based document to which a tag should be associated. The user may then choose an appropriate tag (e.g., object, property, or link) and the tagging system 100 coordinates storage of the tag in relation to the selected text in the object database 150.

Tagging of images within an image-based document. In some embodiments, the tagging system 100 allows the user 120 to select a graphical portion of an image-based document to which a tag should be associated. The user may then choose an appropriate tag and the tagging system 100 coordinates storage of the tag in relation to the graphical portion of the image-based document in the object database 150.

Storage of images as separate image files. In some embodiments the tagging system 100 allows storage of graphical portions of an image-based document to be stored as separate image files. For example, each portion of an image-based document that is selected, such as by applying a tag to the graphical portion, may be extracted and stored as a separate image file. Image files may be in any format, such as JPEG, PNG, BMP, PDF, etc. Image files may each be associated with objects in the object database 150, such as objects that are linked to a corresponding document object associated with the image-based document, or as properties of an existing object, such as the corresponding document object. Thus, accessing the image-based document may allow the user to easily access each of the image files associated with the image-based document. For example, when the document is later accessed, each of the tagged images, as well as any other data associated with the tags (e.g., from the object database 150), may be presented for viewing by the user.

Alignment, Syncing, or Cross-referencing of tags within a paired image-based document and text document (e.g., a text document that includes text extracted from the image-based document). In some embodiments, the tagging system 100 automatically identifies a portion of a text document that includes text that is selected for tagging in the corresponding image-based document, and vice-versa. This tag syncing allows tags, even when in different locations in the image-based and text documents, to be visually indicated as related to the same underlying tagged content. For example, text of a tag at the top of page 2 of an image-based document may be located in the middle of page 1 of the corresponding text document.

Alignment data. In some embodiments, the tagging software may store alignment data, such as in the object database 150, indicating locations of the particular content within each of the image-based and text documents. As noted above, locations of text tags created in an image-based document are automatically determined in the paired text file, and vice versa. For example, the tagging software may determine an occurrence of the tagged text within the text document, where the occurrence indicates position of the tagged text string relative to other occurrences of the same, or similar, text in the text document. For example, text at that same occurrence number within the image-based document may then be located and associated with a new tag that is added in the text document. For example, if the phrase "arachnid" is tagged on page 6 of a text document, the auto-alignment software may determine that the tagged occurrence of "arachnid" is the fourth occurrence in the text document. The software may then search the image-based document to identify the fourth occurrence of "arachnid" in the image-based document, and create update the tag to include a reference to the identified portion of the image-based document, as well as alignment data indicating an association between the tagged content in each of the text and image-based documents.

Data normalization. In some embodiments, text data may be normalized to allow better matching between documents. For example, normalization may include data cleansing, such as removal of extra spaces, punctuation, nonstandard characters, HTML tags, etc. as well as text optimizations that may allow more accurate matching, such as removal of prefixes or suffixes of certain terms. Normalization may be particularly useful for text documents created via an OCR process to improve likelihood of matching text within the documents.

Customization of alignment models. In some embodiments, alignment models are used to determine matches between text portions of corresponding text and image-based documents. Depending on the types of text and/or image-based files, the alignment models may be customized to obtain better matching. For example, an alignment model for aligning tags between an image-based document and a JSON (text) file may indicate that a text selection in an image-based document is aligned with a particular JSON key (e.g., within content associated with the indicated JSON key). For example, selected text in a PDF document that is identified by a text range in the PDF document (e.g., characters 100-104 in the PDF document) may be translated to a JSON key and a text range within the JSON key (e.g., characters 2-6 of JSON key 2). Thus, the alignment process may search the image-based document for occurrences of the text in the particular JSON key, and then search for that same occurrence of the text within the particular JSON key in the corresponding text (e.g., JSON) document to determine which text portions to align in the tag. This custom model may improve accuracy by limiting the scope of the documents (e.g., both the image-based and the text document) used in the alignment process for any give text.

In some embodiments, normalization may include some error tolerance normalization of text, such as to identify misspelled words in the text, determine the appropriate spelling, and include the correct spelling in the alignment process. In some embodiments, an algorithm is applicated to selected text of the image-based document and portions of the text document to calculate match scores indicating a likelihood of a match. For example, a Jaccard similarity score may be calculated to determine likelihood of text portions being related.

Data Expansion. In some embodiments, the tagging software is configured to obtain additional data, such as from one or more external databases, regarding objects that are tagged in one or both of an image-based and/or text document. For example, the text of a tag may be used in one or more searches of external databases to obtain further information regarding that text which may be usable to the user.

Data export. In some embodiments, the tagging system is configured to export selected tags, information related to the objects associated with the tags (e.g., such as external data that is obtained through data expansion), and/or image files of tagged images (e.g., separate image files that are created for graphical tags).

Figure 3:
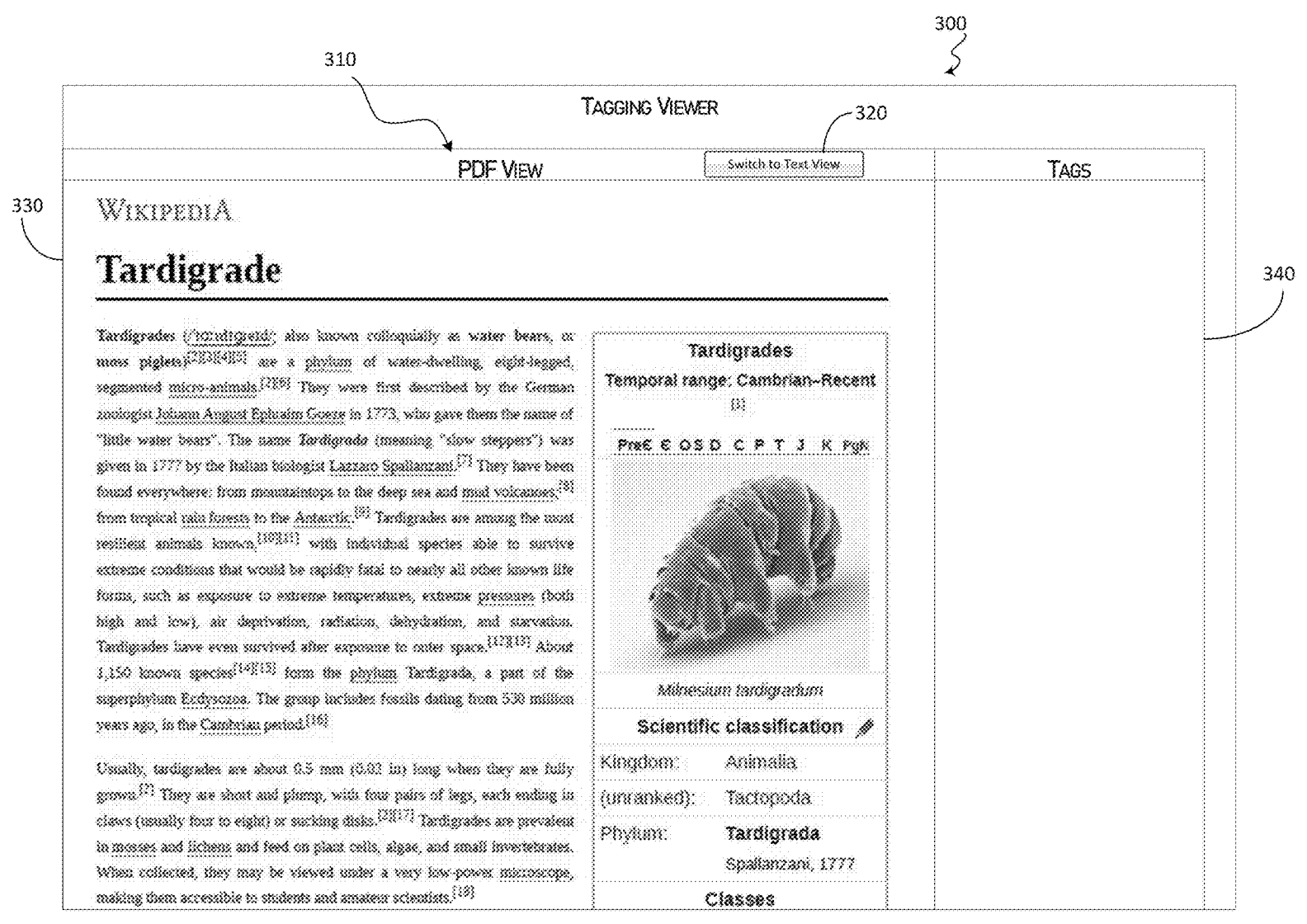

Side-by-side view. In some embodiments, a tagging viewer may include a side-by-side view of image-based and the corresponding text document. In this embodiment, creation of a tag in one of the documents may result in real-time addition and display in the user interface of a corresponding tag in the related document Example Implementations FIG. 3 is an example user interface illustrating one embodiment of a tagging viewer 300 that is usable to view image-based and text documents. While certain example implementations discussed herein refer to a particular type of image-based document, e.g., a PDF document, the disclosed systems and methods are not limited to any type of image-based document and, thus, reference to a particular type of image-based document should be interpreted as referencing any other type of image-based document also.

In this example embodiment, the tagging viewer 300 is currently configured to show a PDF view of a document, as indicated by the current view type indicator 310. The tagging viewer 300 also includes a view change button 320 that allows the user to switch to a text view of the document. The viewer window 330 displays the image-based document, which in this case includes an image panel with a graphical image, as well as formatting, footnotes, and other image-based features. A tag panel 340 is illustrated also, and will indicate tags associated with the document once added.

Figure 4:
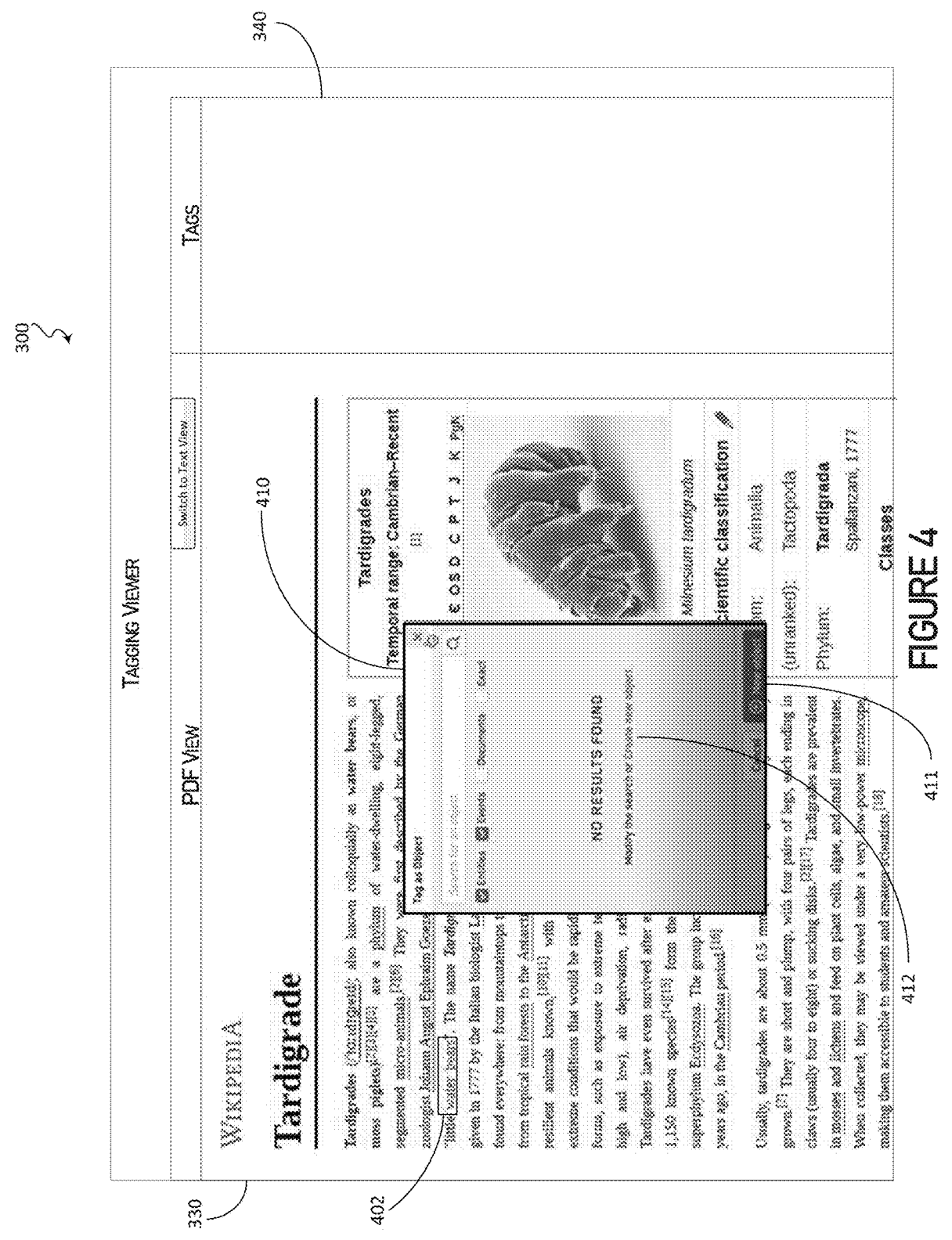

FIG. 4 is an example of the tagging viewer 300 with text of the image-based document selected for tagging. In this example, the user has selected text 402, which caused a tag interface 410 to be displayed. The tag interface 410 allows the user to create a new object in the object database associated with the text "water bears" in this example. The example tag interface 410 also allows the user to search for other objects associated with the document. Once the user selects a new object button (e.g., 411 or 412 in the example of FIG. 4), the selected text becomes a new object associated with the document object.

Figure 5:
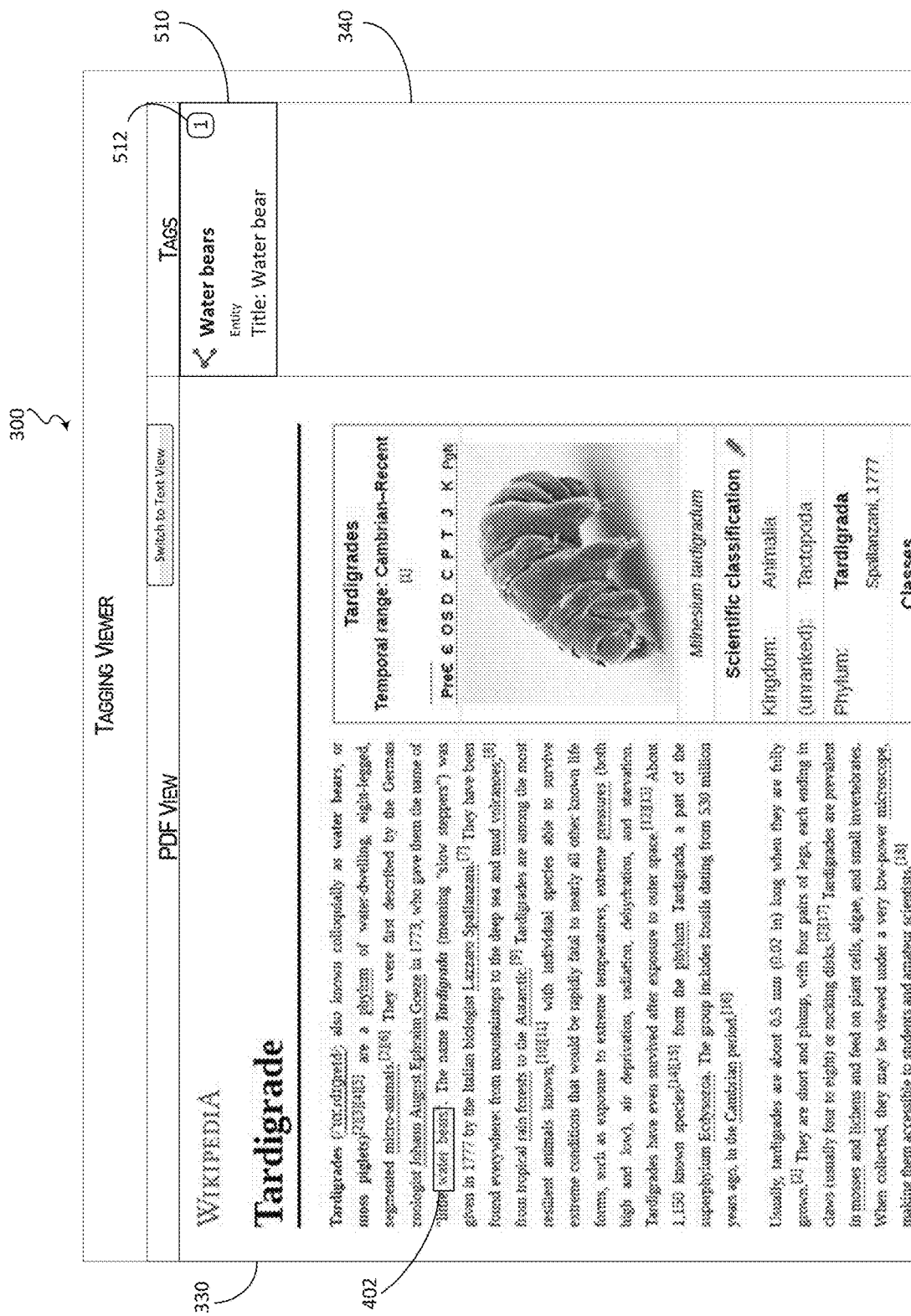
FIG. 5 is an example of the tagging viewer, now with a tag indicator added for the selected text in the viewer window.

FIG. 5 is an example of the tagging viewer 300, now with a tag indicator 510 added for the selected text in the viewer window 330. In this example, the tag indicator 510 shows the text of the tag, as well as the object type of the tag (e.g., "entity"), and a title for the tag (e.g., "Water Bear"). Depending on the embodiment, more or less properties regarding a tag may be provided and the information may be provided via various user interactions. In this example, the tag indicator 510 also includes a relationship indicator 512 indicating the quantity of items in the document associated with this particular tag. If the user was to tag other locations of the document with the text "water bears", the relationship indicator 512 may increase to show a total number of text occurrences associated with the tag.

Figure 6:
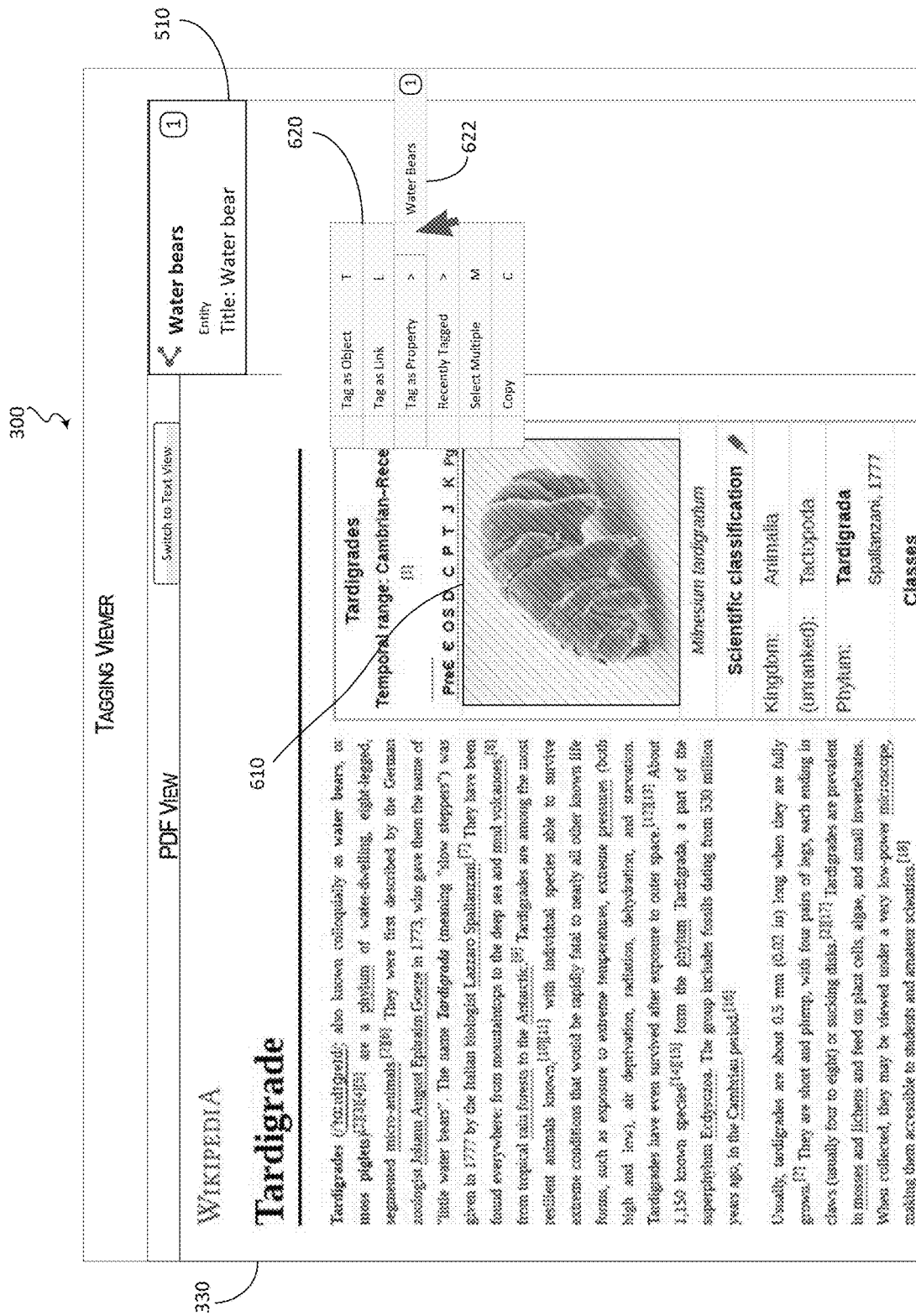
FIG. 6 is an example of the tagging viewer, with a graphical portion of the image-based document selected for tagging.

FIG. 6 is an example of the tagging viewer 300, with a graphical portion 610 of the image-based document selected for tagging. In one embodiment, selection of a graphical area causes a tagging menu 620 to appear. The example tagging menu 620, which may be used to tag text as well as graphical images in some embodiments, provides options for the user to tag the selected graphical portion 610 as a new object, as a link to an existing object(s), or as a property of existing object. In the example of FIG. 6, the user has selected to tag the graphical portion 610 as a property of the existing tag associated with text 402 (e.g., FIG. 4). Thus, once the tag as property command is completed, e.g., by the user clicking on the "water bears" tag indicator 622, the tag indicator 510 may be updated to show that the tag is associated with both a textual portion of the document and a graphical portion of the document. In some embodiments, selection of the graphical portion 610 for tagging causes the tagging system to automatically create an image file of the selected graphical portion and store that image file as a new object or property associated with the document object.

The example tagging menu 620 also includes an option to Select Multiple portions of a document for tagging. For example, upon selecting the Select Multiple options, the user may select multiple text portions and/or graphical portions of the document to each be associated with a tag.

Figure 7:
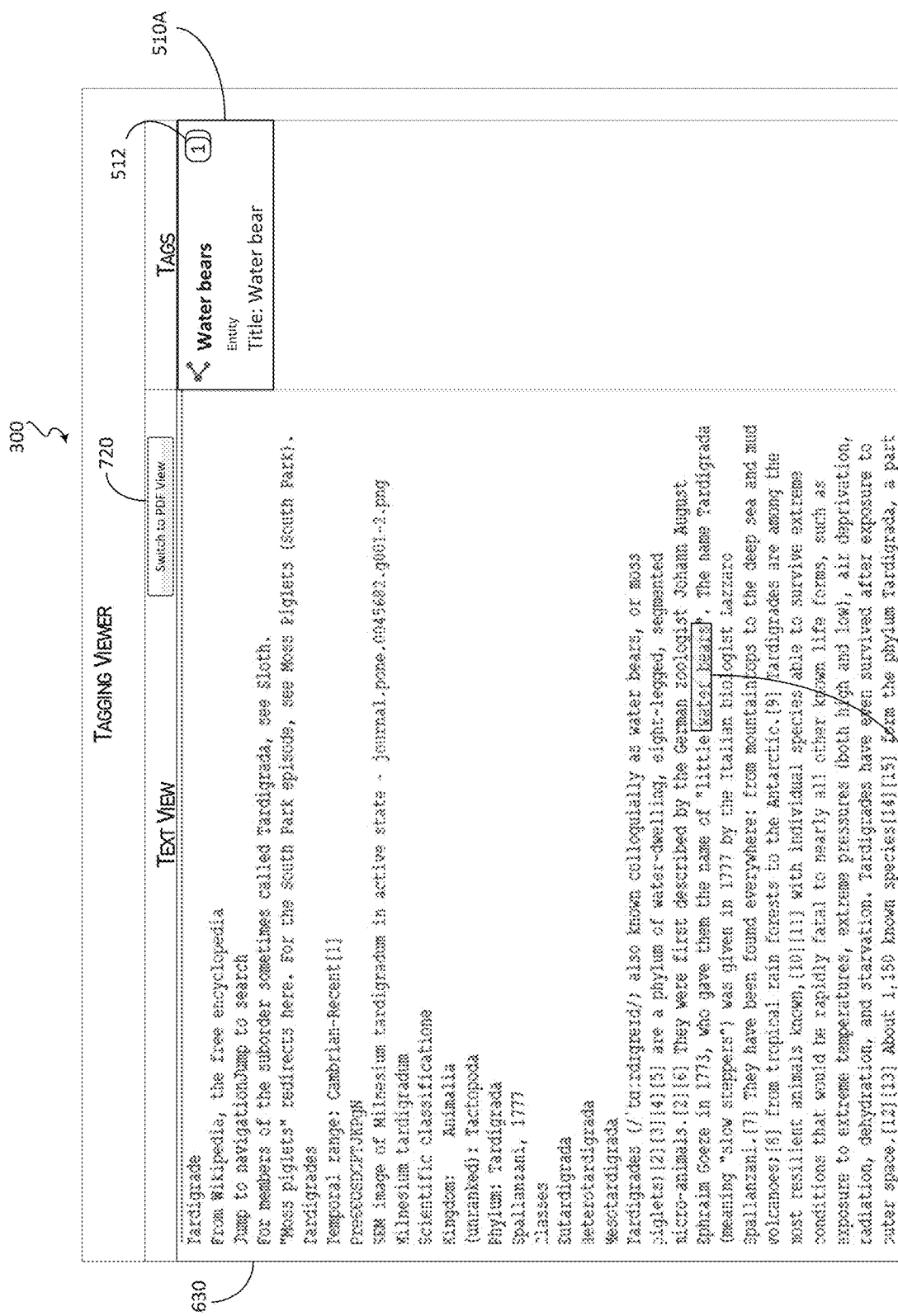
FIG. 7 is an example of the tagging viewer, with a text viewer window replacing the image-based viewer window.

FIG. 7 is an example of the tagging viewer 300, with a text viewer window 630 replacing the image-based viewer window 330. Thus, a textual version of the image-based document is shown in the text viewer window 630. In this example, the user has switched from the image-based viewer window 330 to the text viewer window 630 by selecting the switch to text view button 320 (FIG. 3). Thus, a switch to PDF button 720 is now part of the tagging viewer 300, and is configured to cause the tagging viewer to switch back to display of the image-based document when selected.

As shown in FIG. 7, text 710 corresponding to text that was tagged in the image-based document has automatically been identified and highlighted as tagged in the text document. Additionally, the relationship indicator 512 has been updated to indicate that the tag includes a link to another version of document (e.g., with the overlapping rounded square icons). Identification of matching text between paired documents (e.g., an image-based and text document) may be performed in various matters, such as those discussed below with reference to FIG. 10.

Figure 8:
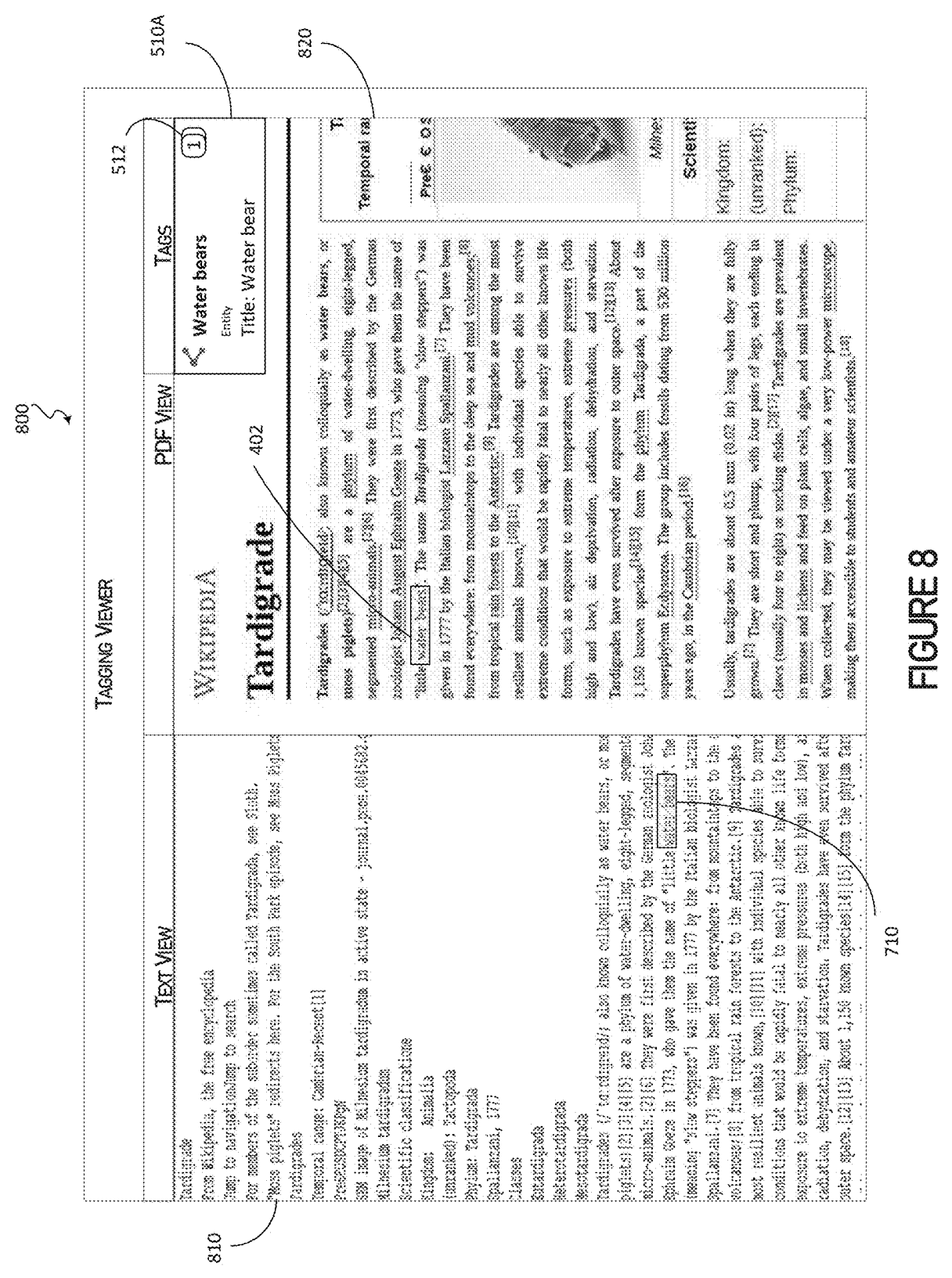

FIG. 8 is an example of a tagging viewer 800 that is configured in a side-by-side viewing mode, showing a portion of both an image-based document and the corresponding portion of the text document. In this example, a text viewer 810 displays a portion of the text document while and image viewer 820 displays a portion of the image-based document. As shown, text 710 (in the text document) and text 402 (in the image-based document) are both highlighted, along with the tag indicator 510A, which includes include an icon 512 indicating that there is one tag shown that is linked between the two documents. In some embodiments, the user can scroll through both versions of the document concurrently, such that a portion of the document in the respective viewers 810, 820 include substantially the same information. Thus, in implementations where the image-based document includes extensive imagery or larger font sizes, for example, a rate of scrolling for the image-based document may be quicker than a previous scrolling for the text document (to maintain alignment of text information displayed in each of the two documents).

Figure 9:
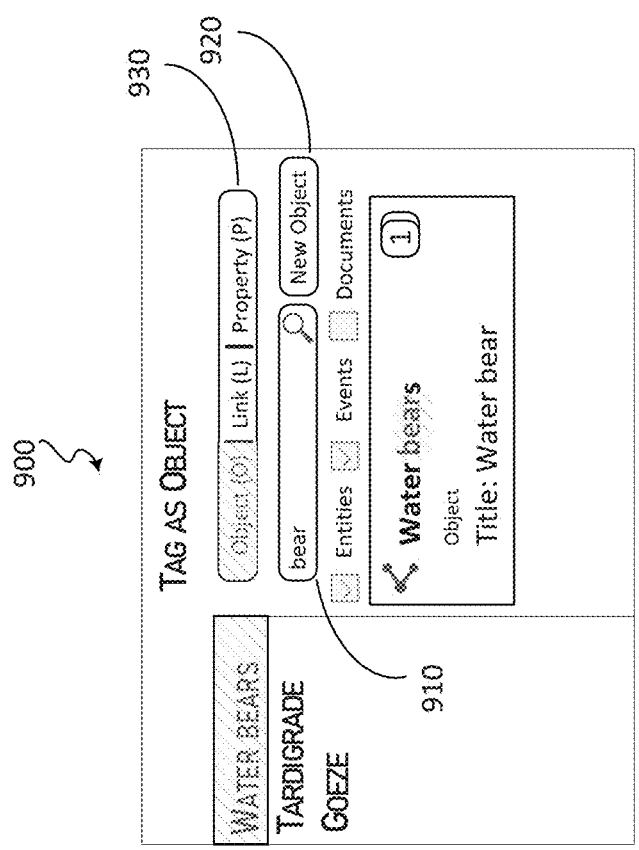
FIG. 9 is an example tagging interface configured to provide tagging options to the user.

FIG. 9 is an example tagging interface 900 configured to provide tagging options to the user. The tagging interface 900 may be displayed in response to the user selecting an untagged text or graphical portion of a document, or by selecting a user interface element and/or keyboard shortcut that is associated with the tagging interface 900. The example tagging interface 900 allows the user to search existing tags via search interface 910, where tags that are included in search results may be limited based on object types and/or other characteristics of tags. For example, in the example of FIG. 9, the user has selected entities and events as object types to be included in the search query. The example tagging interface 900 also allows creation of a new tag, by first selecting a characteristic of the new tag via menu 930 (e.g., to create a new object, link, or property based on currently selected text or graphic) and then to create the new tag by selecting new object button 920.

Figure 10:
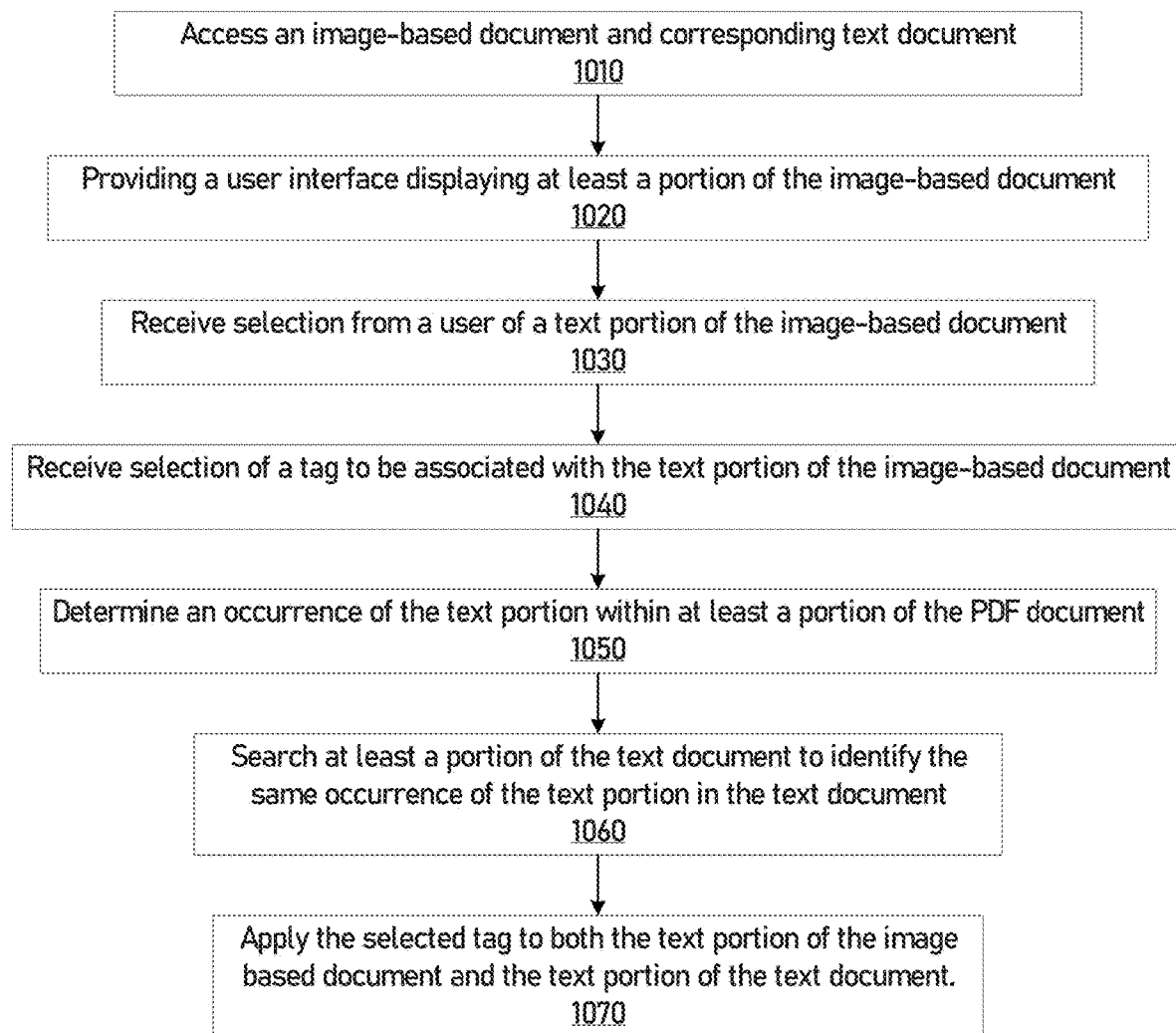
FIG. 10 is a flowchart illustrating one embodiment of a method of adding tags to multiple versions of a document, such as both an image-based and text version of a document.

FIG. 10 is a flowchart illustrating one embodiment of a method of adding tags to multiple versions of a document, such as both an image-based and text version of a document. In one embodiment, the method may be performed by the tagging system 100 (FIG. 1), while in other embodiments portions or all of the method may be performed by other computing devices, such as the user device 120. Depending on the embodiment, the method of FIG. 10 may include fewer or additional blocks and/or the blocks may be performed in order different than is illustrated.

Beginning at block 1010, the tagging system accesses an image-based document and a corresponding text document. As noted above, in some implementations the tagging system is provided with both versions of the document, such as from the document parser. In other embodiments, the tagging system extracts text data from the image-based document, such as by performing an optical character recognition process on the image-based document. While PDFs are discussed herein as an example image-based document, the systems and methods disclosed herein are usable on any other type of image-based document. Similarly, text documents that are discussed herein may include various file formats that comprise primarily text.

Moving to block 1020, a user interface is provided to a user, such as user 120 of FIG. 1, that allows viewing of one or both of the text document and/or image-based document.

Next, at block 1030, the user selects, via the user interface, a text portion of the image-based document. For example, the user may select one or more words of the image-based document to which a tag will be associated.

Next, at block 1040, the tagging system receives selection of a tag to be associated with the selected text portion of the image-based document. For example, the user may provide a type of tag to be associated with the selected text, such as a new object, a link, or a property (e.g., of an already existing object). Additionally, the user may be provided an opportunity to supply other data regarding the tag, such as a tag name.

Blocks 1050 and 1060 of FIG. 10 illustrates an example process for determining alignment data between a tag that has been added in an image-based document and the corresponding text document. In other embodiments, other methods of aligning a tag between documents may be performed, such as using custom alignment models associated with particular types of text and/or image-based documents. Similar alignment methods may be performed when identifying text for tagging in an object-based document matching text selected in a text document.

At block 1050, the tagging system determines an occurrence of the text portion within at least a portion of the image-based document. For example, the tagging system may count occurrences of the text portion within the image-based document. For example, for the selected text of "water bear", the tagging system may search the image-based document to identify multiple occurrences of "water bear", with the particular selected occurrence being the fifth. In one embodiment, the counting begins at the beginning of the document, while in other embodiments the counting may begin at some well definable boundary within the document, such as the boundary just prior to the selected text portion. For example, in some embodiments the text document and image-based document include corresponding page numbers, such that text within any given page (e.g., between text indicating adjacent page numbers) is aligned with text on that same page in the corresponding document version. In such an embodiment, the tagging system may begin counting occurrences of the text portion on the particular page where the text is selected.

Continuing to block 1060, the text document is searched for a corresponding occurrence of the text portion identified in the image-based document. For example, if the counting began at the beginning of the image-based document, counting within the text document similarly occurs at the beginning of the document. With reference to the example above, the text document may be searched for the fifth occurrence of the term "water bear" starting from the beginning of the text document. If the tagging system began counting occurrences of the text portion at some other boundary within the image-based document, that same boundary is used as the starting point within the text document. For example, if counting began on a certain page within the image-based document, search for occurrences of text within the text document would begin on that same page.

Another example of an alignment process that may be performed at blocks 1050 and 1060, for example, makes use of a custom alignment model. For example, a model or rule may be associated with a particular type or types of documents and/or document content. Thus, in some embodiments, alignment between an image-based and text document may be performed based on a model that is selected for that particular type of document(s). For example, for a text document that includes HTML code (whether in a .txt or .html file container) may cause selection of an alignment model that is particular to HTML documents, which may be customized to obtain better matching of portions of HTML documents. In this example, with the HTML alignment model selected (e.g., automatically by the alignment system based on detection of HTML content in the text document), the location of text that is selected in the image-based document may be expressed as a section identifier and a character range within that section. This location information may then be used to search for the selected text in the text document, such as by limiting search for the characters selected in the image-based document to section(s) of the text document matching the indicated section identifier.

In some embodiments, a custom model may indicate types and/or parameters of normalization that should be performed. For example, a model for HTML content may indicate that certain (or all) tags (e.g., <b>, </b>, etc.) are removed from the document. This normalization of the content may reduce the amount of text that is searched (both in the originally tagged document and the document where the corresponding text is to be located), as well as reduce the likelihood of errors in the text.

At block 1070, the selected tag is associated with the text portion in both the image-based document and the corresponding text portion in the text document. For example, the text portions in each document may be highlighted as being tagged when displayed to the user. The tag may be stored in an object database, along with alignment data that indicates position of the tag within each of the text document and image-based document.

Alerts and Notification

In some embodiments, the tagging system 100 may provide alerts and/or other notifications to entities having an interest in generation and/or updates to document tags. For example, an alert may provide a real-time notice to an analyst (e.g., via user device 120 of FIG. 1) that a document with information on a topic of interest has been tagged by a data ingestion team. In some embodiments, alerts may be automatically transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Example Computing System Architecture and Operation

Figure 11:
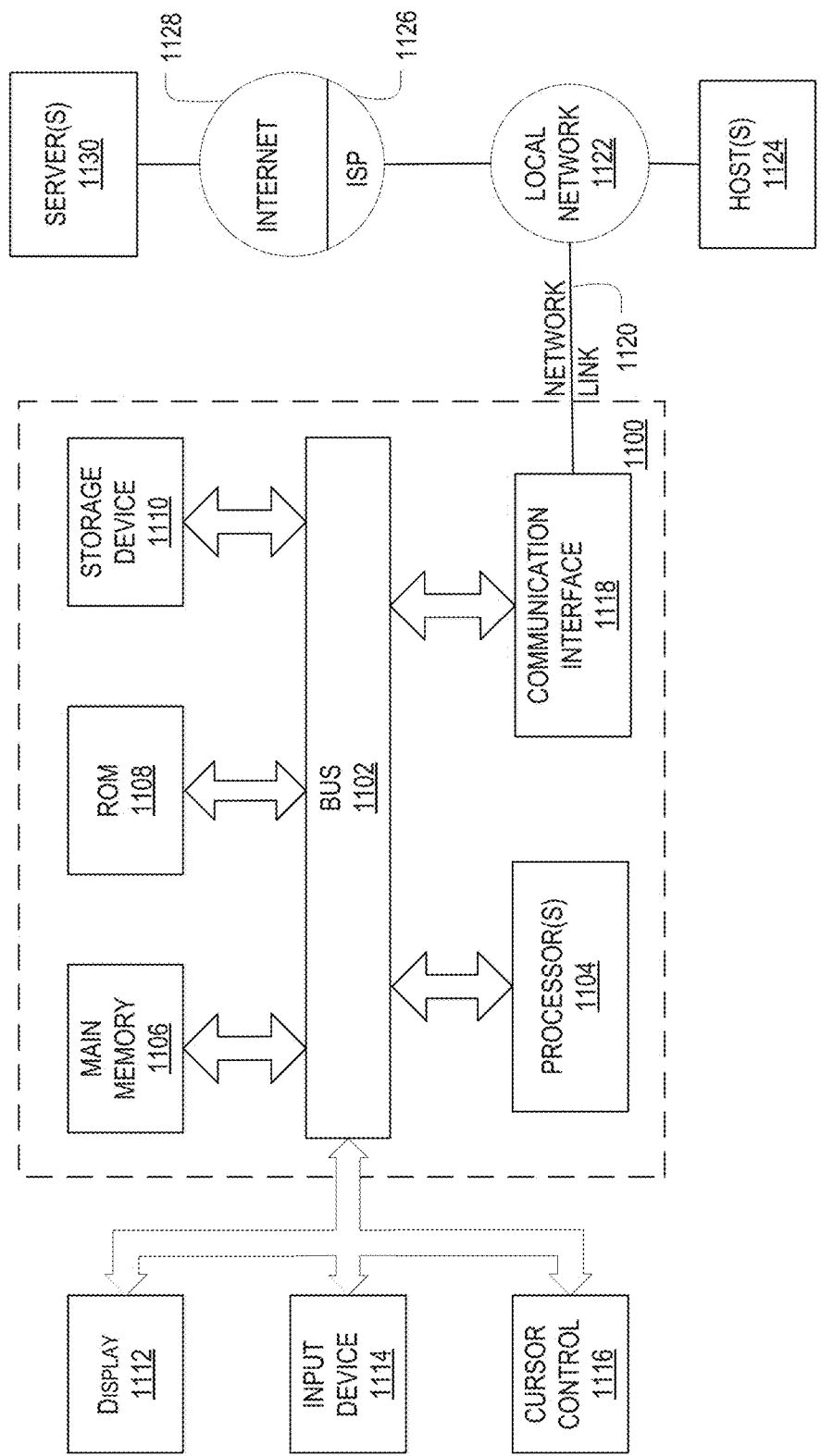
FIG. 11 illustrates a computer system with which certain methods discussed herein may be implemented.

FIG. 11 illustrates a computer system 1100 with which certain methods discussed herein may be implemented. For example, the tagging system 110 and/or the user device 120 may include some, all, or additional components as discussed below with reference to system 1100.

Computer system 1100 includes a bus 1102 or other communication mechanism for communicating information, and a hardware processor, or multiple processors 1104 coupled with bus 1102 for processing information. Hardware processor(s) 1104 may be, for example, one or more general purpose microprocessors.

Computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

Computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1100 may include a user interface module to implement a GUI that may be stored in a mass storage device as computer executable program instructions that are executed by the computing device(s). Computer system 1100 may further, as described below, implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more computer readable program instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 106, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:
   accessing a first document and a second document;
   receiving selection of target text within a first document portion of the first document, the target text including a plurality of characters of text;
   determining a target occurrence, associated with the received selection of the target text, of a plurality of occurrences of the target text within the first document;
   analyzing at least a portion of the second document to identify the same target occurrence of the target text in a second document portion of the second document;
   storing an alignment data indicating a relationship between the target text, the first document portion of the first document, and the second document portion of the second document; and
   wherein the alignment data is usable in a user interface to identify the second document portion of the second document when displayed and to identify the first document portion of the first document when displayed.

2. The computerized method of claim 1, further comprising:
   receiving selection of a tag type to be associated with the target text, wherein the tag types include at least object, property, and link.

3. The computerized method of claim 1, further comprising:
   receiving selection of a graphical portion of either the first or second document.

4. The computerized method of claim 1, storing the graphical portion as a separate image file.

5. The computerized method of claim 1, further comprising normalizing at least one or the first and second documents by automatically removing extra spaces, punctuation, nonstandard characters, and/or HTML tags.

6. The computerized method of claim 1, wherein the alignment data further indicates the target occurrence of the target text.

7. The computerized method of claim 1, Wherein the alignment data indicates a first character range associated with the target text within the first document.

8. The computerized method of claim 1, wherein the alignment data indicates a second character range associated with the target text within the second document.

9. The computerized method of claim 1, wherein the alignment data indicates a first section identifier of the first document associated with the target text in the first document.

10. The computerized method of claim 1, wherein the alignment data indicates a second section identifier of the second document associated with the target text in the second document.

11. The computerized method of claim 1, further comprising:
    determining a custom model to be used in identifying the plurality of occurrences of the target text within the first document.

12. The computerized method of claim 11, wherein the custom model is selected based on a file type of the first document or the second document.

13. The computerized method of claim 11, wherein the custom model indicates keys, tags, headers, or other indicator of content to be used in said identifying the plurality of occurrences of the target text within the first document.

14. The computerized method of claim 2, wherein the tag indicates that the text portion is one of an object, a link to one or more existing objects, or a property of one or more existing objects.

15. The computerized method of claim 1, wherein at least one of the first and second documents includes one or more graphical images.

16. A computing system comprising:
    a hardware computer processor;
    a non-transitory computer readable medium having software instructions stored thereon, the software instructions executable by the hardware computer processor to cause the computing system to perform operations comprising:
    accessing a first document and a second document;
    receiving selection of target text within a first document portion of the first document, the target text including a plurality of characters of text;

determining a target occurrence, associated with the received selection of the target text, of a plurality of occurrences of the target text within the first document;

analyzing at least a portion of the second document to identify the same target occurrence of the target text in a second document portion of the second document;

storing an alignment data indicating a relationship between the target text, the first document portion of the first document, and the second document portion of the second document; and wherein the alignment data is usable in a user interface to identify the second document portion of the second document when displayed and to identify the first document portion of the first document when displayed.

17. The computerized method of claim 16, further comprising:

receiving selection of a tag type to be associated with the target text, wherein the tag types include at least object, property, and link.

18. The computerized method of claim 16, further comprising:

receiving selection of a graphical portion of either the first or second document.

19. The computerized method of claim 16, storing the graphical portion as a separate image file.

20. The computerized method of claim 16, further comprising normalizing at least one or the first and second documents by automatically removing extra spaces, punctuation, nonstandard characters, and/or HTML tags.

* * * * *

UNITED STATES PATENT AND TRADEMARK OFFICE
CERTIFICATE OF CORRECTION

| | |
|---|---|
| PATENT NO. | : 11,853,684 B2 |
| APPLICATION NO. | : 18/068955 |
| DATED | : December 26, 2023 |
| INVENTOR(S) | : Suchan Lee et al. |

It is certified that error appears in the above-identified patent and that said Letters Patent is hereby corrected as shown below:

In the Specification

Column 10, Line 59, delete "document" and insert -- document. --.

In the Claims

Column 22, Line 24, Claim 7, delete "Wherein" and insert -- wherein --.

Column 23, Line 16, Claim 17, delete "computerized method of claim 16, further comprising" and insert -- computing system of claim 16, wherein the software instructions are further configured to cause the computing system to --.

Column 23, Line 21, Claim 18, delete "computerized method of claim 16, further comprising" and insert -- computing system of claim 16, wherein the software instructions are further configured to cause the computing system to --.

Column 23, Line 25, Claim 19, delete "computerized method of claim 16," and insert -- computing system of claim 16, wherein the software instructions are further configured to cause the computing system to --.

Column 23, Line 27, Claim 20, delete "computerized method of claim 16, further comprising" and insert -- computing system of claim 16, wherein the software instructions are further configured to cause the computing system to --.

Signed and Sealed this
Third Day of September, 2024

Katherine Kelly Vidal
*Director of the United States Patent and Trademark Office*